United States Patent [19]
Kokuga

[11] Patent Number: 5,608,305
[45] Date of Patent: Mar. 4, 1997

[54] METHOD AND APPARATUS FOR COMPULSORY DISCHARGING LITHIUM-ION BATTERY TO PREVENT QUALITY DEGRADATION

[75] Inventor: Toshiharu Kokuga, Sumoto, Japan

[73] Assignee: Sanyo Electric Co., Ltd., Osaka, Japan

[21] Appl. No.: 326,373

[22] Filed: Oct. 20, 1994

[30] Foreign Application Priority Data

Oct. 29, 1993 [JP] Japan .................................. 5-272381

[51] Int. Cl.$^6$ .......................... H01M 10/44; H01M 10/46
[52] U.S. Cl. ............................... 320/13; 320/21; 320/31; 320/32; 320/39
[58] Field of Search .................................. 320/13, 14, 22, 320/30, 31, 32, 39, 40, 48, 5, 23, 21

[56] References Cited

U.S. PATENT DOCUMENTS 5,442,274  8/1995  Tamai ........................................ 320/23
5,475,294  12/1995  Isoda ........................................ 320/14

OTHER PUBLICATIONS

"Nikkei Electronics", Apr. 26, 1993 (No. 579).

*Primary Examiner*—Edward H. Tso
*Attorney, Agent, or Firm*—Wenderoth, Lind & Ponack

[57] ABSTRACT

A method and apparatus for protecting a secondary battery initially judges whether or not the secondary battery, previously charged to a capacity more than a predetermined capacity, has been discharged to a capacity less than the predetermined capacity within a predetermined time. Then, compulsorily discharging at the secondary battery is effected until it has a capacity less than the predetermined capacity when it is judged that the secondary battery has not been discharged to a capacity less than the predetermined capacity.

10 Claims, 4 Drawing Sheets

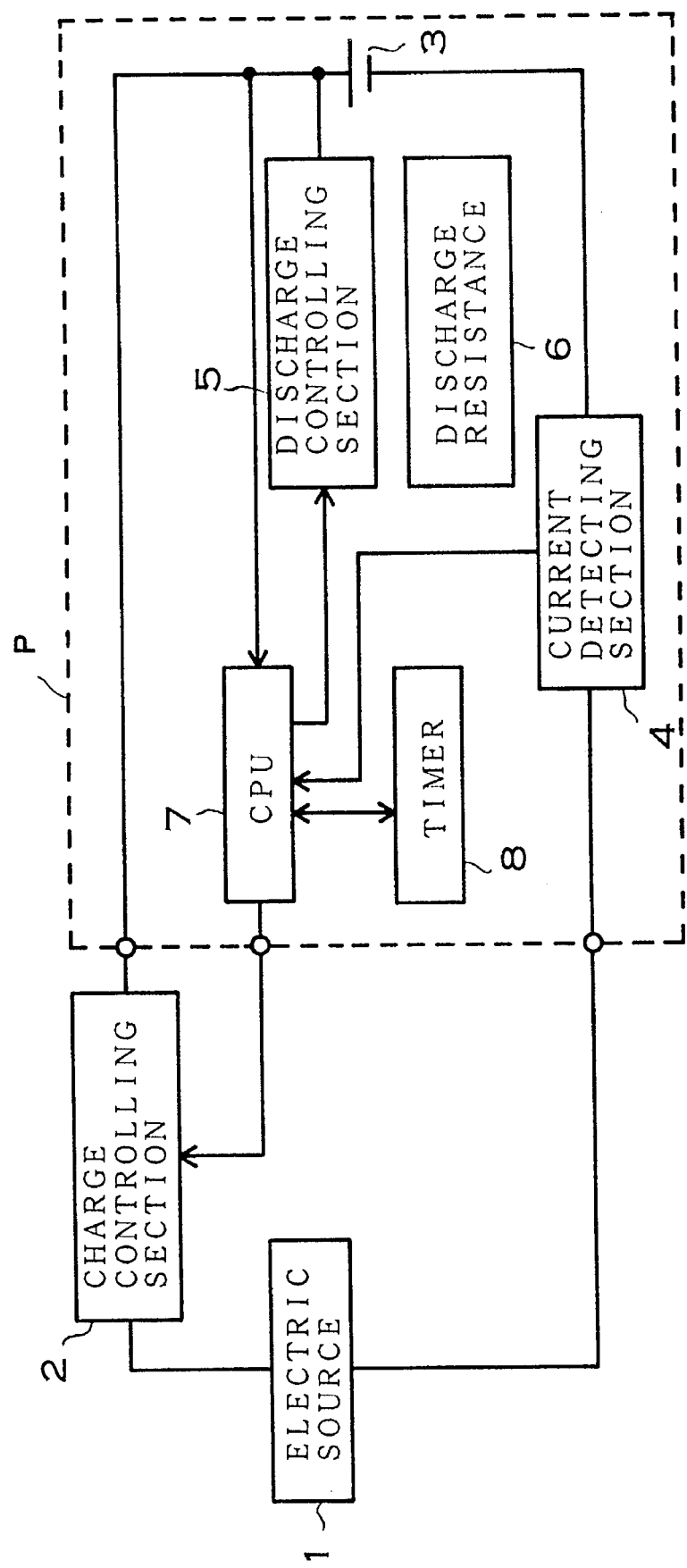

METHOD AND APPARATUS FOR COMPULSORY DISCHARGING LITHIUM-ION BATTERY TO PREVENT QUALITY DEGRADATION

BACKGROUND OF THE INVENTION

1. Field of Invention

The present invention relates to a method and an apparatus for protecting a secondary battery charged to have a capacity exceeding predetermined value.

2. Brief Description of Prior Arts.

A secondary battery used as an electric source for electronic machines and instruments such as video cameras, personal computers and the like must be made smaller in size and at the same with a larger capacity, particularly as such electronic machines and instruments become higher in quality and smaller in size themselves.

A lithium-ion secondary battery has been developed as such a secondary battery fulfilling the above-mentioned requirements, as described in the magazine "Nikkei Electronics" dated April 26th in 1993(No.579).

However, it has become apparent, that if such a lithium-ion secondary battery is nearly in a full charge state and is left for a long time, the characteristic of the lithium-ion secondary battery is degraded, and if the lithium-ion secondary battery is fully charged thereafter, it cannot recover its former capacity. For example, if such a lithium-ion secondary battery in the full charge state is left at room temperature for a month, the capacity of the same is reduced by 7 to 8% and finally as much as 20 to 30%.

Therefore, an object of the present invention is to provide a method and an apparatus for controlling capacity reduction of a secondary battery which is otherwise caused when the battery is left for a long time.

SUMMARY OF THE INVENTION

A method for protecting a secondary battery according to the present invention includes judging whether or not the secondary battery previously charged to a charge capacity which is more than a predetermined value has been discharged to a capacity less than a predetermined value within a predetermined time, and, when it is judged that the secondary battery has not been so discharged, compulsorily discharging the secondary battery.

Further, an apparatus for protecting a secondary battery according to the present invention protects a secondary battery previously charged to a charge capacity which is more than a predetermined value, and the apparatus comprises a judging means and a discharging means. The judging means judges whether or not the secondary battery has been discharged to a capacity less than a predetermined value within a predetermined time. When it is judged that the secondary battery has not been discharged to a capacity less than the predetermined value within the predetermined time, the discharging means compulsorily discharges the secondary battery till the secondary battery has the predetermined capacity.

According to the present invention, the judging means judges whether or not a secondary battery previously charged to a capacity more than a predetermined value, for example, charged to a full charge state, is then discharged to a capacity less than a predetermined value within a predetermined time. And when it is judged that the secondary battery has not been so discharged, the secondary battery is compulsorily discharged till it has a capacity less than the predetermined value, and then the secondary battery is stored in this state.

A method for protecting a secondary battery according to the present invention can effectively prevent lowering of the quality of a secondary battery stored in the full charge state. The method according to the present invention comprises detecting the charge capacity of a charged secondary battery, judging whether or not the secondary battery has been discharged to a capacity less than a predetermined value within a predetermined time, and, when it is judged that the secondary battery has not so discharged, compulsorily discharging the secondary battery to a capacity less than the predetermined value.

Therefore, according to the present invention, capacity reduction of a secondary battery caused by long time storage can be controlled and the life of the secondary battery can be extended.

The present invention will be explained hereinafter in more detail with reference to the appended drawings.

BRIEF DESCRIPTION OF THE DRAWINGS

FIG. 4 is a block diagram showing another embodiment of the present invention.

DETAILED DESCRIPTION OF THE INVENTION

Figure 1:
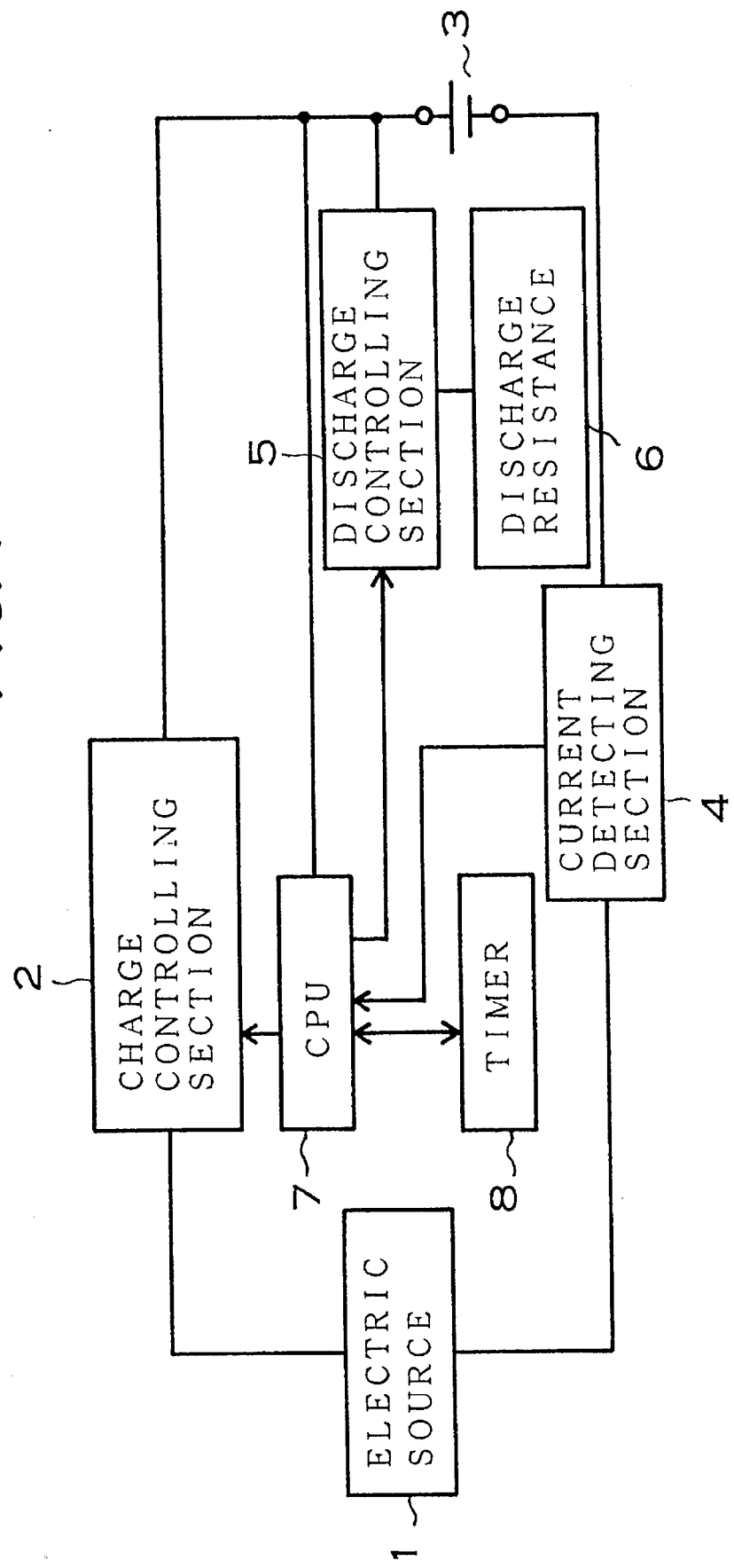
FIG. 1 is a block diagram showing an embodiment of the present invention.

FIG. 1 is a block circuit diagram showing an embodiment of an apparatus for protecting a secondary battery according to the present invention which is set in a charger. Numeral 1 indicates an electric source comprising, for example, a voltage lowering transformer, a rectifying circuit and the like. Numeral 2 indicates a charge controlling section for transforming a current and a voltage from the electric source 1 to a predetermined constant current and a predetermined constant voltage and adequately supplying the same. Numeral 3 indicates a secondary battery which is charged with a constant current and a constant voltage supplied by the charge controlling section 2 and which is a lithium-ion secondary battery. The secondary battery 3 can be set in and removed from the charger.

Numeral 4 indicates a current detecting section for detecting a charge current of the secondary battery 3 and thereby detecting whether the secondary battery 3 is in the full charge state or not. Numeral 5 indicates a discharge controlling section which is connected to the secondary battery 3 and which controls compulsory discharge from the secondary battery 3. Numeral 6 indicates a discharge resistance for discharging the secondary battery 3. Numeral 7 indicates a CPU for controlling the operations of the charge controlling section 2, the discharge controlling section 5 and the like. Numeral 8 indicates a timer for measuring a predetermined time (e.g. 2 days) from the time when the secondary battery 3 become the full charge state.

Figure 2:
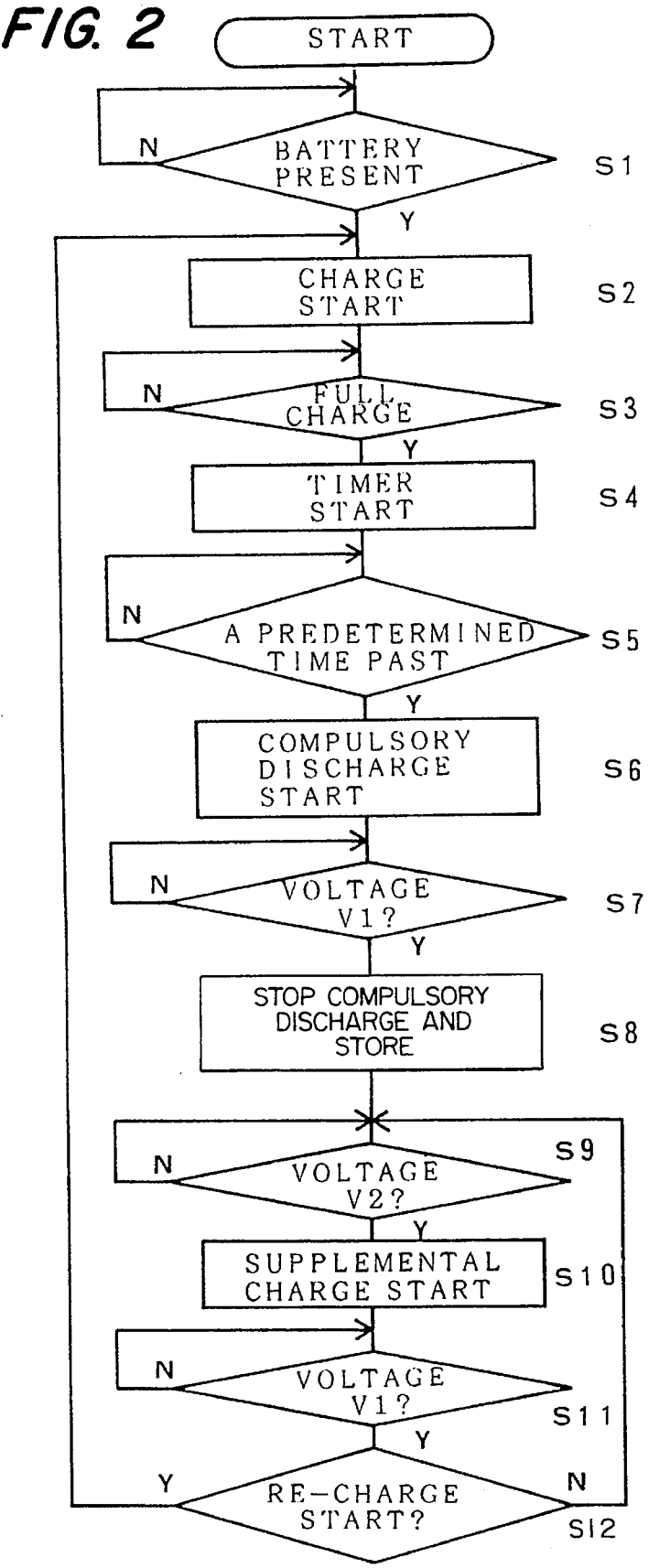
FIG. 2 is a flow chart explaining the present invention.

FIG. 2 is a flow chart showing the operation of the embodiment of the present invention of FIG. 1. At step S1, it is judged whether the secondary battery 3 is set in the charger or not. This is judged, for example, by judging whether or not the battery voltage of the secondary battery 3 set in the charger is detected by the CPU 7. Otherwise, a mechanical detecting switch may be provided at the position where the secondary battery 3 is set so as to detect the secondary battery.

When the secondary battery 3 to be charged is set in the charger, charging is started at step S2. This charging is carried out by a constant voltage and a constant current, for example, 4.2V charge voltage and 1.2A charge current under the control of the charge controlling section 2.

At step 3, it is judged whether or not the charge current detected by the current detecting section 4 is less than a predetermined value, and then depending upon this judgement, it is judged whether the secondary battery 3 has reached the full charge state or not.

When the secondary battery 3 reaches the full charge state, charging of the secondary battery 3 is stopped and at the same time the timer 8 is actuated at step S4. At step S5, it is judged whether 2 days have passed after the actuation of the timer or not. The timer 8 measures whether or not the secondary battery 3 charged to the full charge state and set in the charger, namely charged for more than 2 days is discharged in 2 days. If the secondary battery 3 is removed from the charger before 2 days are past, the timer stops measuring and is reset.

After the lapse of 2 days, the secondary battery 3 is compulsorily discharged under the control of the discharge controlling section 3 at step 6. The compulsory discharging of the secondary battery 3 is carried out till the remaining capacity of the secondary battery 3 becomes less than about 60%.

Figure 3:
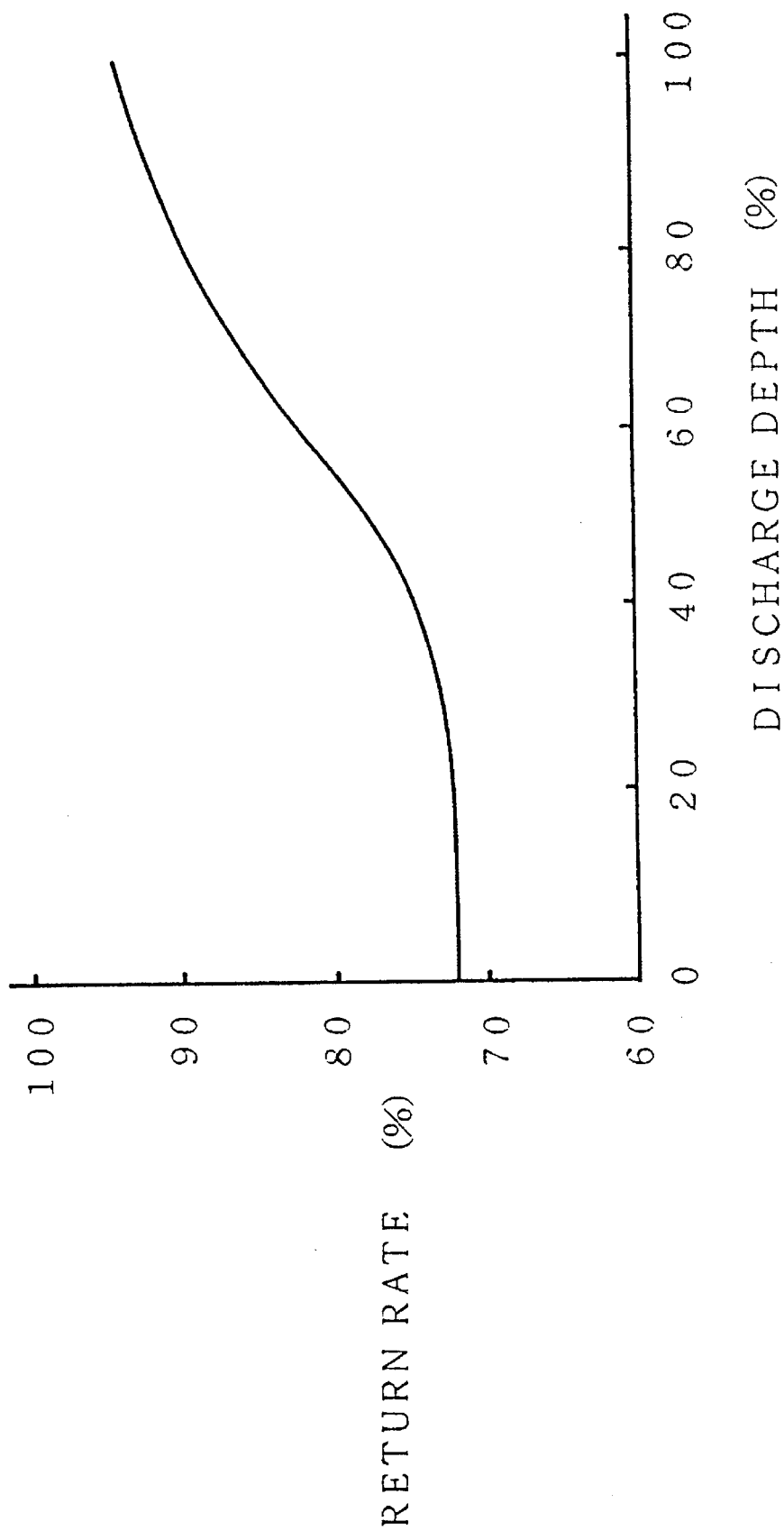
FIG. 3 is a characteristic graph showing control degree of capacity reduction of a secondary battery.

FIG. 3 shows the capacity return rate of the secondary battery 3 when the secondary battery 3 is charged to the full charge state, compulsorily discharged by an arbitrary capacity, and then left at a temperature of 60° C. for 20 days. In FIG. 3, discharge depth indicated by the axis of abscissa means the rate of the compulsory discharge capacity to the battery capacity of the secondary battery 3 when the secondary battery 3 in the full charge state is discharged to a battery voltage before overcharge (e.g.2.5V), namely, the dischargeable capacity. In a compulsory discharge in which the remaining capacity of the secondary battery 3 is more than 60%, the capacity cannot return only nearly to 70% of the former capacity even with the later sufficient charging, and in other words, the capacity is reduced by as much as 30%. On the other hand, it is observed that when the compulsory discharge is carried out till the remaining capacity becomes less than about 60%, the capacity reduction is controlled.

At step 7, it is judged whether the battery voltage of the secondary battery becomes a predetermined voltage V1 (e.g. 3.35V) or not, thereby judging whether the remaining capacity of the secondary battery 3 reaches 60% or not. When the battery voltage of the secondary battery 3 reaches the predetermined voltage V1, the compulsory discharge of the secondary battery 3 is stopped and thereafter the secondary battery 3 is stored in this state at step 8.

However, the remaining capacity of the secondary battery 3 can be detected, not through the detection of the battery voltage, but through the integration of the discharge current or depending upon the discharge time.

Further, in this embodiment, it is judged at step 9 whether or not the secondary battery 3 has made self discharge through a long time stoage and the battery voltage of the same becomes lower than a predetermined voltage V2 (e.g.2.5V). When the battery voltage becomes lower than the predetermined voltage V2, the supplemental charge of the secondary battery 3 is started at step S10. And at step S11, when the battery voltage of the secondary battery 3 reaches the predetermined voltage V1, the supplemental charge is ended.

Further, at step 12, it is judged whether a re-charge switch (not shown) is operated or not. When the re-charge switch is not operated, the secondary battery 3 in storage is cycled from step S8 to step S12, and every time the battery voltage becomes lower than the predetermined voltage V2, the secondary battery 3 is supplementally charged to the predetermined voltage V1. Then at step S11, when the re-charge switch is operated, the program returns to step S2, and the secondary battery 3 is re-charged to the full charge state.

As above-mentioned, when the secondary battery 3 charged to have a capacity more than a predetermined value (charged to the full charge state in this embodiment) is thereafter left without being discharged in a predetermined time, the lowering of quality of the secondary battery 3 through a long time storage can be controlled by automatically compulsorily discharging the secondary battery to have a capacity less than the predetermined value.

However in the above-mentioned embodiment, if the secondary battery 3 is removed from the charger and stored for a long time, the compulsory discharge cannot be carried out.

Therefore, in another embodiment shown in FIG. 4, a current detecting section 4, a discharge controlling section 5, a discharge resistance 6, a CPU 7 and the timer 8 are contained together with the secondary battery 3 in a battery pack P. As the result, even if the secondary battery 3 has a capacity more than a predetermined value, for example, it is in the full charge state and the battery pack P is removed from the charger, the lowering of quality of the secondary battery 3 can be also controlled, because, when the secondary battery 3 is left without being discharged to a capacity less than a predetermined value (namely, 60% of the dischargeable capacity) in a predetermined time, the secondary battery 3 is automatically compulsorily discharged according to steps S4 to S8.

If the secondary battery 3 in the full charge state is discharged in a predetermined time but the capacity of the second battery 3 does not become less than the predetermined value, the timer 8 is actuated again after the discharge is ended. And it is judged whether or not the secondary battery 3 is discharged to a capacity less than the predetermined value within the predetermined time. And when the capacity is not less than the predetermined value, the secondary battery 3 is compulsorily discharged.

What is claimed is:

1. A method for avoiding a reduction in the quality of a secondary battery, comprising the steps of:

(a) detecting a charge capacity of the secondary battery and judging whether the thus detected charge capacity is more than a predetermined value;

(b) judging whether a predetermined time period has elapsed during a state in which the charge capacity of the secondary battery is judged to be more than the predetermined value; and (c) compulsorily discharging the secondary battery until the charge capacity of the secondary battery is less than the predetermined value when the predetermined time period has elapsed.

2. A method as claimed in claim 1, wherein the secondary battery is a lithium-ion secondary battery.

3. A method as claimed in claim 2, wherein the predetermined value of the secondary battery is a capacity of about 60% of a dischargeable capacity of the secondary battery.

4. An apparatus for avoiding a reduction in the quality of a secondary battery, comprising:

(a) a detecting means for detecting a charge capacity of the secondary battery;

(b) a first judging means for judging whether the charge capacity detected by said detecting means is more than a predetermined value;

(c) a second judging means for judging whether a predetermined time period has elapsed during a state in which the charge capacity of the secondary battery is judged by said first judging means to be more than the predetermined value; and (d) a discharging means for discharging the secondary battery until the charge capacity of the secondary battery is less than the predetermined value when said second judging means judges that the predetermined time period has elapsed.

5. An apparatus as claimed in claim 4, wherein the secondary battery is a lithium-ion secondary battery.

6. An apparatus as claimed in claim 5, wherein the predetermined value of the secondary battery is a capacity of about 60% of a dischargeable capacity of the secondary battery.

7. An apparatus as claimed in claim 4, further comprising a battery pack containing therein the secondary battery, said first and second judging means and said discharging means.

8. A method for avoiding a reduction in the quality of a secondary battery, comprising the steps of:

initially charging the secondary battery, and then ceasing the initial charging of the battery and starting a timer when a charge capacity of the secondary battery reaches a full charge capacity;

detecting a compulsory discharge condition in which the charge capacity of the secondary battery is more than a predetermined charge capacity for more than a predetermined time interval as measured by the timer, the predetermined charge capacity being less than the full charge capacity; and compulsitory discharging the secondary battery to reduce the charge capacity of the secondary battery to less than the predetermined charge capacity when the compulsory discharge condition is detected in said detecting step.

9. A method as claimed in claim 8, wherein the secondary battery is a lithium-ion battery.

10. A method as claimed in claim 9, wherein the predetermined charge capacity is about 60% of the full charge capacity.

* * * * *